United States Patent [19]
Okamoto et al.

[11] Patent Number: 5,181,160
[45] Date of Patent: Jan. 19, 1993

[54] DRIVING CIRCUIT FOR INVERTER MICROWAVE OVEN

[75] Inventors: Mitsuo Okamoto, Yamatotakada; Hirokazu Kodama, Kashihara; Kouji Minamino, Fujiidera, all of Japan

[73] Assignee: Sharp Kabushiki Kaisha, Osaka, Japan

[21] Appl. No.: 733,197

[22] Filed: Jul. 19, 1991

[30] Foreign Application Priority Data

Jul. 26, 1990 [JP] Japan .................................. 2-200688
May 24, 1991 [JP] Japan .................................. 3-120160

[51] Int. Cl.$^5$ ...................... H02M 3/337; H05B 6/64
[52] U.S. Cl. .................................. 363/97; 363/25; 363/133; 219/10.55 R; 219/10.55 B
[58] Field of Search ............... 363/24, 25, 95, 97, 363/131, 132, 133, 134; 219/10.55 R, 10.55 B

[56] References Cited

U.S. PATENT DOCUMENTS 4,593,167  1/1986  Nilssen .......................... 219/10.55 B Primary Examiner—Emanuel T. Voeltz

[57] ABSTRACT

A driving circuit for an inverter microwave oven which includes a push-pull voltage type inverter circuit having two sets of switching element groups each provided with more than two switching elements connected in parallel to each other for switching the D.C. current supplied from a D.C. power source, a control device arranged to set a period for simultaneously turning OFF the two sets of switching element groups and to alternately turn ON the switching element groups by the same duty cycle, a step up transformer supplied, at its primary winding having a center tap, with A.C. current from the inverter circuit, and a voltage doubler rectifier circuit connected to a secondary winding of the step-up transformer for supplying electric power to a magnetron through a capacitor. The driving circuit is set so that one half period of a waveform of current flowing through the switching elements becomes equal to the duty cycle by adjusting the leakage inductance of the step-up transformer, the capacitance value of the capacitor and the circuit resistance of the voltage doubler rectifier circuit or the duty cycle of the switching elements.

4 Claims, 10 Drawing Sheets

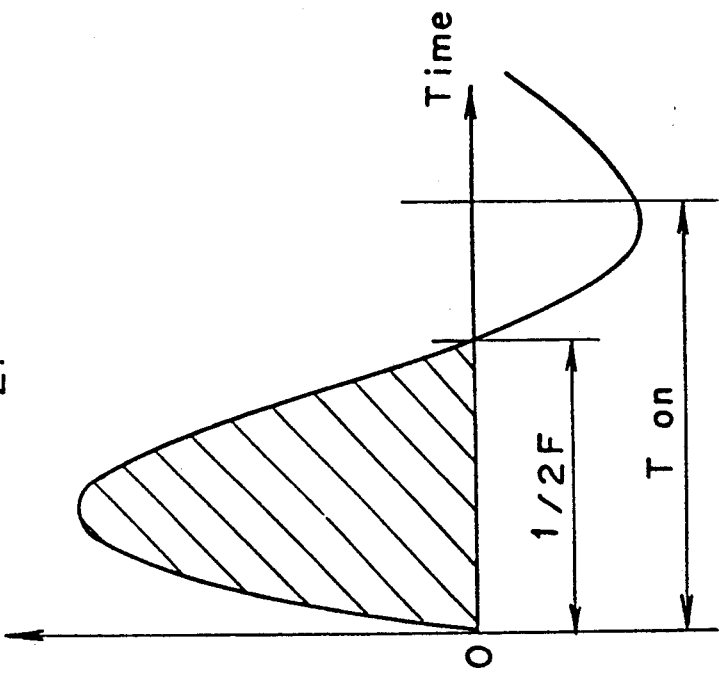
Fig. 5(a) Comparative example at T on < 1/2F
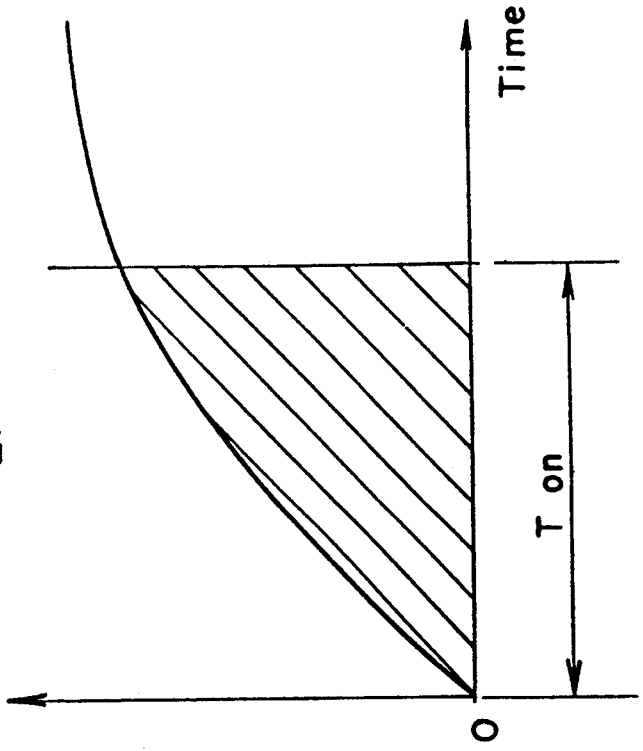
Fig. 5(b) Comparative example at T on > 1/2F

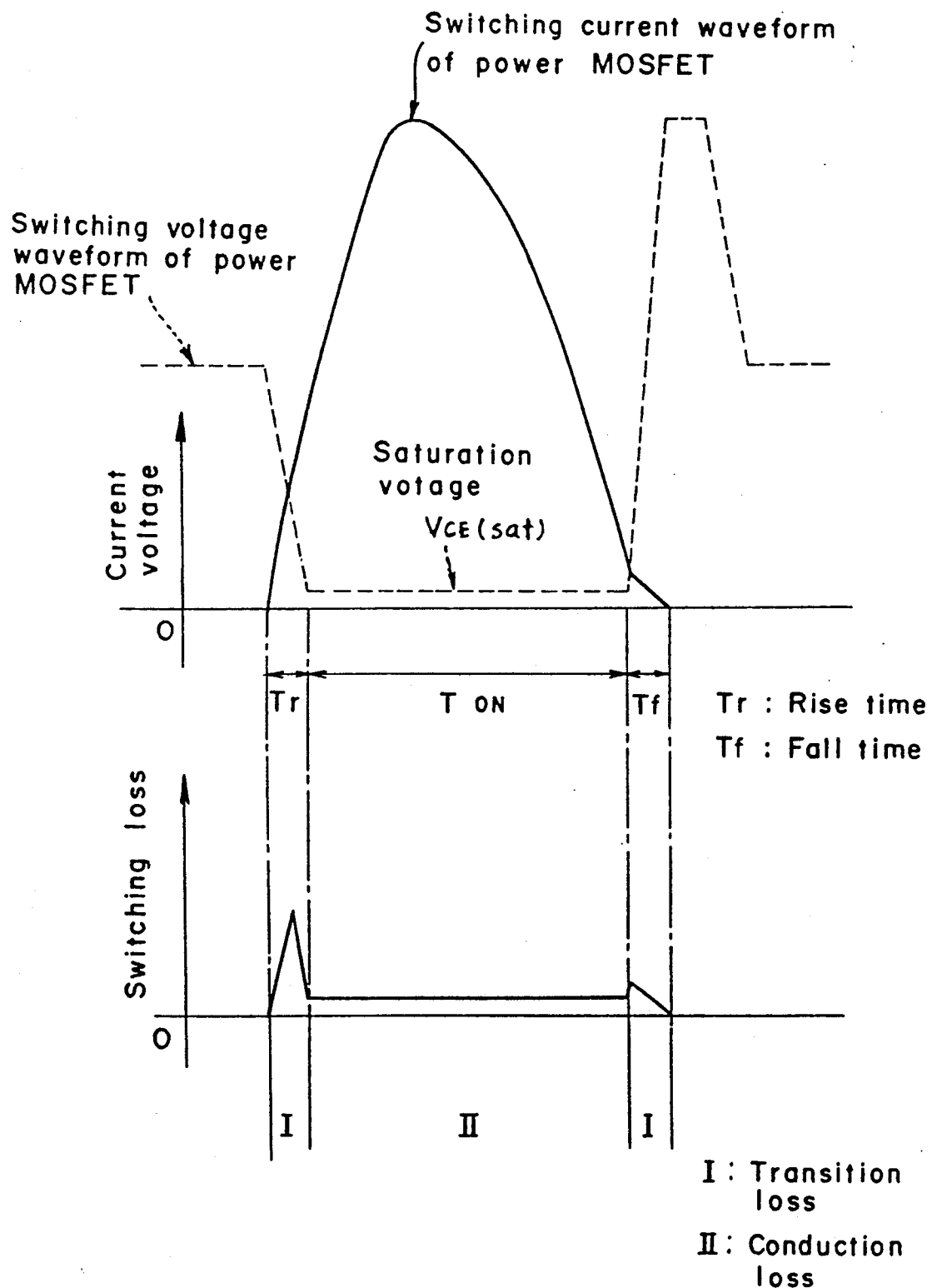

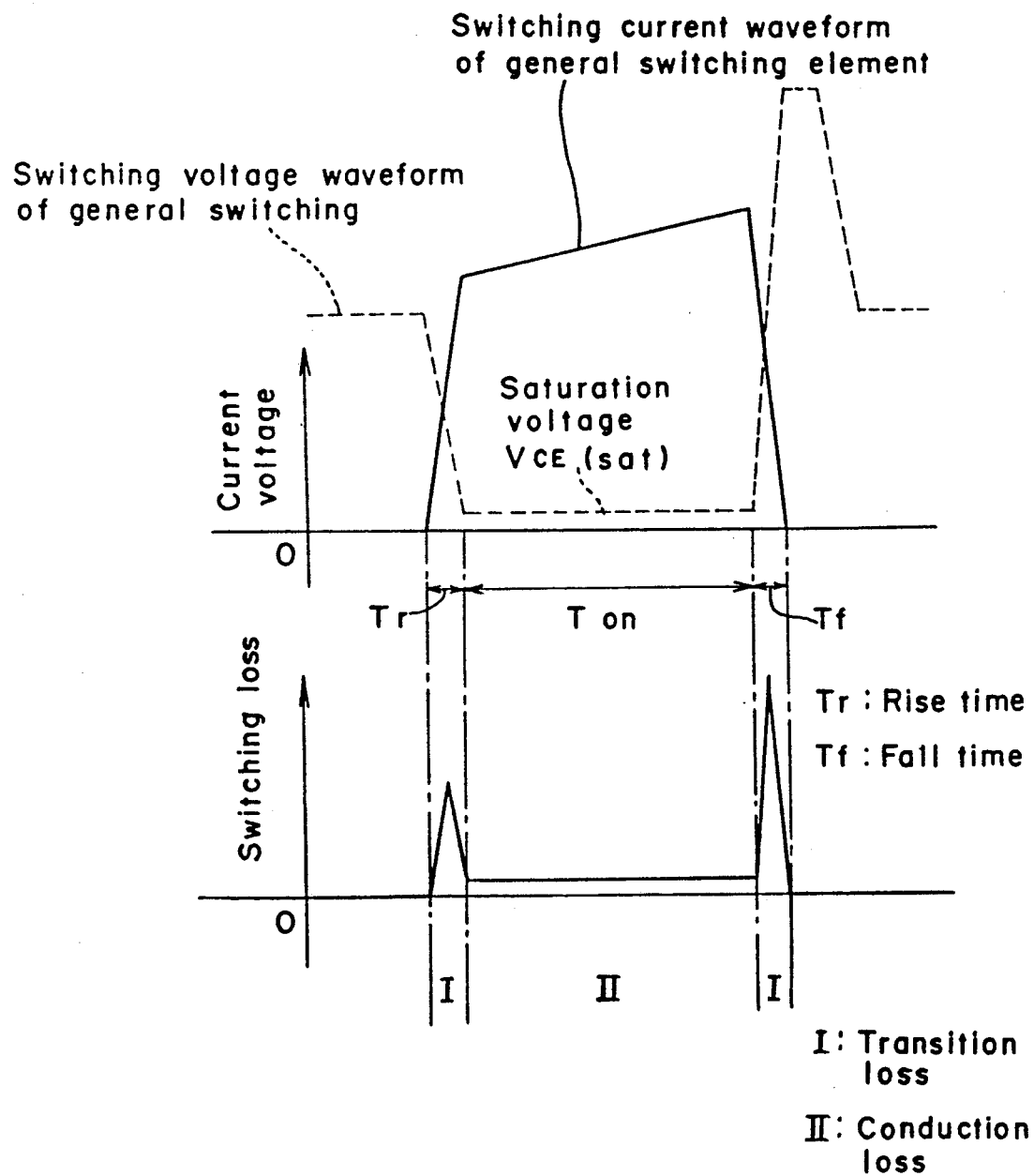

DRIVING CIRCUIT FOR INVERTER MICROWAVE OVEN

BACKGROUND OF THE INVENTION

The present invention generally relates to a high frequency heating arrangement and more particularly, to a driving circuit of an inverter microwave oven arranged to convert a low voltage D.C. power supply into a high frequency current of a high voltage for rectification by a voltage doubler rectifier circuit so as to feed electric power to a magnetron or the like.

Recently, there have been developed various kinds of electric and electronic appliances normally used by a commercial A.C. power source, which are capable of being used outdoors. Such appliances are required to be driven by a low voltage D.C. power supply at 12 V or 24 V or the like, for example, a storage battery for an automobile, etc. Thus, also with respect to the inverter microwave oven which is widely utilized at present, outdoor use thereof has been attempted.

FIG. 10(a) shows a general construction of a conventional typical inverter microwave oven. In this inverter microwave oven, A.C. power obtained from a commercial power source (100 V, 50/60 Hz) is converted into D.C. power by a rectifier circuit, and the D.C. power is formed into high frequency power by a one-transistor resonance type inverter circuit so as to be raised in voltage by a step-up transformer. The output of the step-up transformer is rectified by a voltage doubler rectifier circuit and is utilized for driving a magnetron.

In the case where the above inverter microwave oven is to be used by a low voltage D.C. power source, as shown in FIG. 10(b), a DC/AC inverter is provided between the low voltage D.C. power source and the inverter microwave oven so as to convert the output of the low voltage D.C. power source into the same A.C. power of 100 V, 50/60 Hz as that of the commercial A.C. power source by the DC/AC inverter for operating the inverter microwave oven by the A.C. power.

However, when the inverter microwave oven is used with the low voltage D.C. power source as described above the practice to input the A.C. power, into the inverter microwave oven by employing the DC/AC inverter, since the power conversion is effected two times at the DC/AC inverter and the inverter circuit of the inverter microwave oven, there is such a problem that the utilization rate of the electric power is extremely lowered, while the cost for the power supply circuit is undesirably increased due to the fact that two inverters are required.

Meanwhile, although it is theoretically possible to alter the arrangement to directly connect the low voltage D.C. power source to the one-transistor resonance type inverter power source circuit of the conventional inverter microwave oven, switching elements having a very large current capacity are required to cope with the lowering of the power source voltage. Such switching elements as referred to above are either not commercially available or become very expensive to be prepared.

SUMMARY OF THE INVENTION

Accordingly, an essential object of the present invention is to provide a driving circuit for an inverter microwave oven which may be operated by a low voltage D.C. power source at a large output and high efficiency.

Another object of the present invention is to provide a driving circuit for an inverter microwave oven of the above described type, which is compact in size and simple in construction, and can be readily manufactured at low cost.

In accomplishing these and other objects, according to one aspect of the present invention, there is provided a driving circuit for an inverter microwave oven comprising a push-pull voltage type inverter circuit including two sets of switching element groups each having more than two switching elements connected in parallel to each other for switching D.C. current supplied from a D.C. power source, and control means arranged to set a period for simultaneously turning off said two sets of switching element groups and to alternately turn on said switching element groups by the same duty cycle, a step-up transformer supplied with A.C. current at its primary winding having a center tap from said inverter circuit, and a voltage doubler rectifier circuit connected to a secondary winding of said step-up transformer for supplying electric power to a magnetron through a capacitor.

The driving circuit is so set that one half period of a waveform of current flowing through said switching elements becomes equal to said duty cycle by adjusting the leakage inductance of said step-up, transformer, the capacitance value of the capacitor and the circuit resistance of said voltage doubler rectifier circuit or the duty cycle of said switching elements.

In another aspect of the present invention, the driving circuit as described above further includes a filter circuit including a coil and a capacitor provided between said push-pull voltage type inverter circuit and said D.C. power source. Also the driving circuit is set so that one half period of a waveform of current flowing through said switching elements becomes equal to said duty cycle by adjusting the leakage inductance of said step-up transformer, the composite capacitance value of the respective capacitors and the circuit resistance of said voltage doubler rectifier circuit and said filter circuit or the duty cycle of said switching elements.

When the respective switching elements of one of the switching element groups are turned ON from the state where the respective switching elements of the two switching element groups are simultaneously turned OFF (i.e. a rest period), the voltage doubler capacitor is charged by current drawing an arc of oscillation set by the leakage inductance of the step-up transformer, the capacitance of the voltage doubler capacitor of the voltage doubler rectifier circuit, and the circuit resistance (excluding the resistance of the magnetron). The magnitude of the charging voltage of the voltage doubler capacitor is determined by an initial voltage of the voltage doubler capacitor and a length of ON time of the switching elements. Then, when the respective switching elements of the same switching element group as described earlier are turned OFF, electromagnetic energy stored in the step-up transformer is regenerated to the power source, while being supplied to the voltage doubler capacitor, for thereby establishing the rest period.

Subsequently, after the rest period, when the respective switching elements of the other switching element groups are turned ON, electric energy is supplied to the magnetron by the current drawing an arc of oscillation to be determined by the leakage inductance of the step-up transformer, the capacitance of the voltage doubler capacitor, and the circuit resistance (including the resistance of the magnetron). Here, the electric power to be supplied to the magnetron is determined by the voltage of the voltage doubler capacitor and the length of ON time of the switching elements. Thus, when the respective switching elements of the switching element groups are turned OFF, the electromagnetic energy stored in the step-up transformer is regenerated to the power source, while being supplied to the magnetron.

The magnetron oscillates the high frequency power by the switching function as described above is repeated.

In this case, the current waveform of the switching element is subjected to oscillation by a natural frequency determined by the circuit constant, i.e. the leakage inductance of the step-up transformer, the capacitance value of the voltage doubler capacitor, and the circuit resistance. Since the one half period of the natural frequency and the ON Time of the switching elements are made equal to each other through adjustment of the value for the circuit constant such as the leakage inductance of the step-up transformer or by adjusting the ON Time of the switching elements, the circuit output power to be outputted becomes a maximum. Moreover, at this time, since the current flowing through the switching elements during the transition time from the OFF state to the ON state, and from the ON state to the OFF state of the switching elements becomes almost zero, the transition loss also becomes very small, with a consequent reduction of the switching loss. Furthermore, since the switching element groups have the switching elements connected in parallel, the ON resistance of the switching element groups may be reduced for lowering the resistance in the driving circuit.

BRIEF DESCRIPTION OF THE DRAWINGS

These and other objects and features of the present invention will become apparent from the following description taken in conjunction with the preferred embodiment thereof with reference to the accompanying drawings, in which;

FIG. 6 is a diagram for explaining switching loss of a power MOSFET employed in the embodiment of the present invention, FIG. 7 is a diagram similar to FIG. 6 for explaining switching loss of a general switching element.

DETAILED DESCRIPTION OF THE INVENTION

Figure 1:
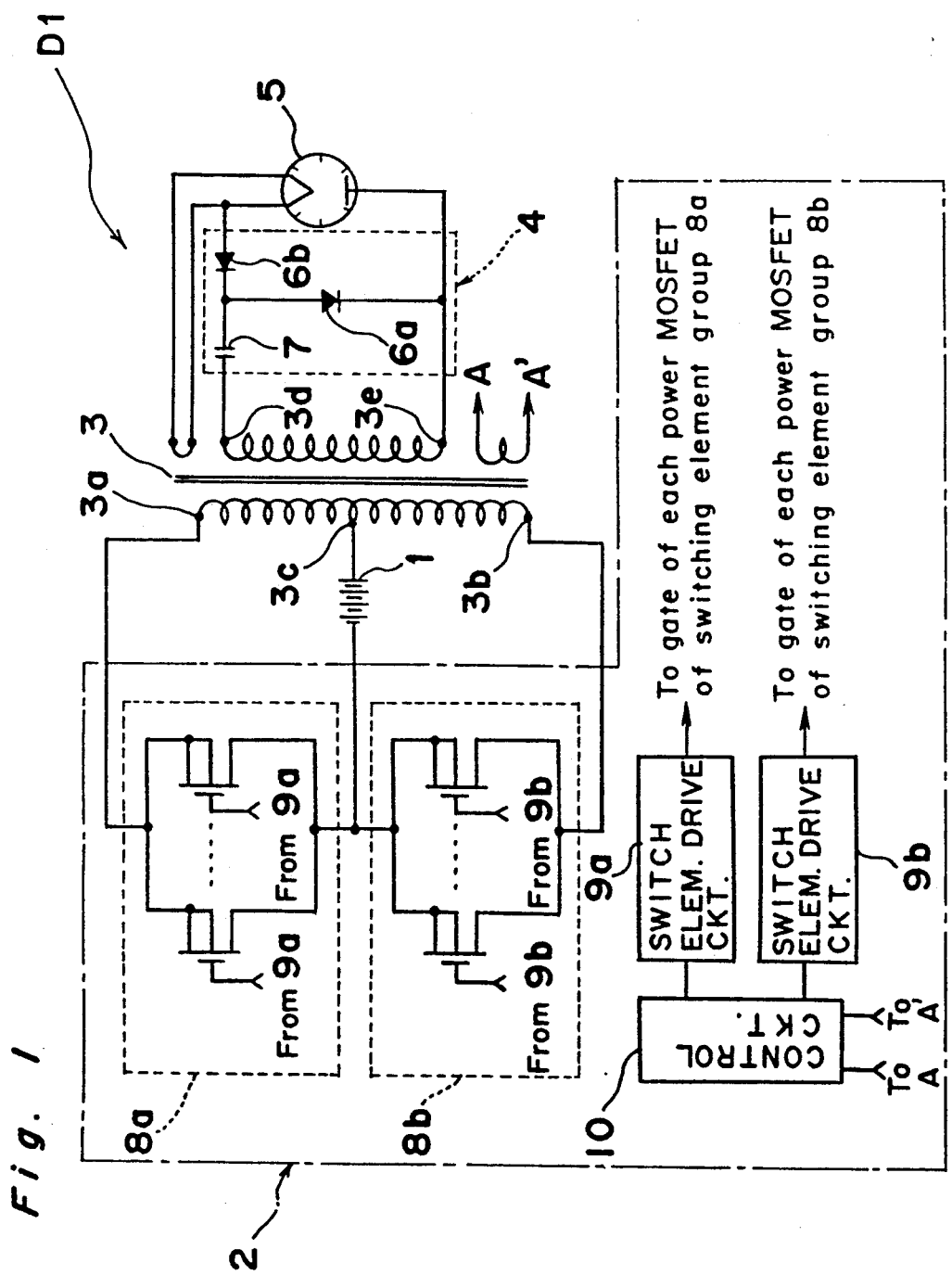
FIG. 1 is a circuit diagram showing the general construction of a driving circuit for an inverter microwave oven according to one preferred embodiment of the present invention.

Before the description of the present invention proceeds, it is to be noted that like parts are designated by like reference numerals throughout the accompanying drawings.

Referring now to the drawings, there is shown in FIG. 1, a driving circuit D1 for an inverter microwave oven according to one preferred embodiment of the present invention.

As shown in FIG. 1, the driving circuit D1 generally includes a push-pull voltage type inverter circuit 2 (referred to as an inverter circuit hereinafter) for converting a D.C. power of a low voltage D.C. power source 1, e.g. a storage battery for an automobile, into a high frequency power, a step-up transformer 3 for raising a power source voltage, and a voltage doubler half-wave rectifier circuit 4 for rectifying the output of the step-up transformer 3 and for driving a magnetron 5 by an output of the voltage doubler half-wave rectifying circuit 4. From a secondary side of the step-up transformer 3, current for heating a filament of the magnetron 5 is also supplied.

The voltage doubler half-wave rectifier circuit 4 has a known construction, and includes two high voltage diodes 6a and 6b and a voltage doubler capacitor 7 connected to the secondary side of the step-up transformer 3 and the magnetron 5 as shown.

The inverter circuit 2 includes two sets of switching element groups 8a and 8b each having more than two power MOSFET (i.e. Metal Oxide Semi-conductor Field Effect Transistor) connected in parallel to each other, for switching element drive circuits 9a and 9b coupled therewith as shown and a control circuit 10.

The drains of the power MOSFETs included in the switching element groups 8a and 8b are respectively connected to one end 3a and the other end 3b of the primary winding for the step-up transformer 3, with the sources of the power MOSFETs being connected to each other, and the gates of the power MOSFETs are adapted to be driven by the control circuit 10 through the switching element drive circuits 9a and 9b. Accordingly, the current flowing through the primary side of the step-up transformer 3 is subjected to switching at high speed. The power MOSFET described as employed for the switching elements included in the switching element groups 8a and 8b may be replaced by other switching elements such as IGBT (Insulated Gate Bi-polar Transistor), etc.

The D.C. power source 1 has its one end connected to a junction between the sources of the power MOSFET of the switching element group 8a and the sources of the power MOSFET of the switching element group 8b, and its other end connected to a center tap 3c of the primary winding of the step-up transformer 3.

Figure 2:
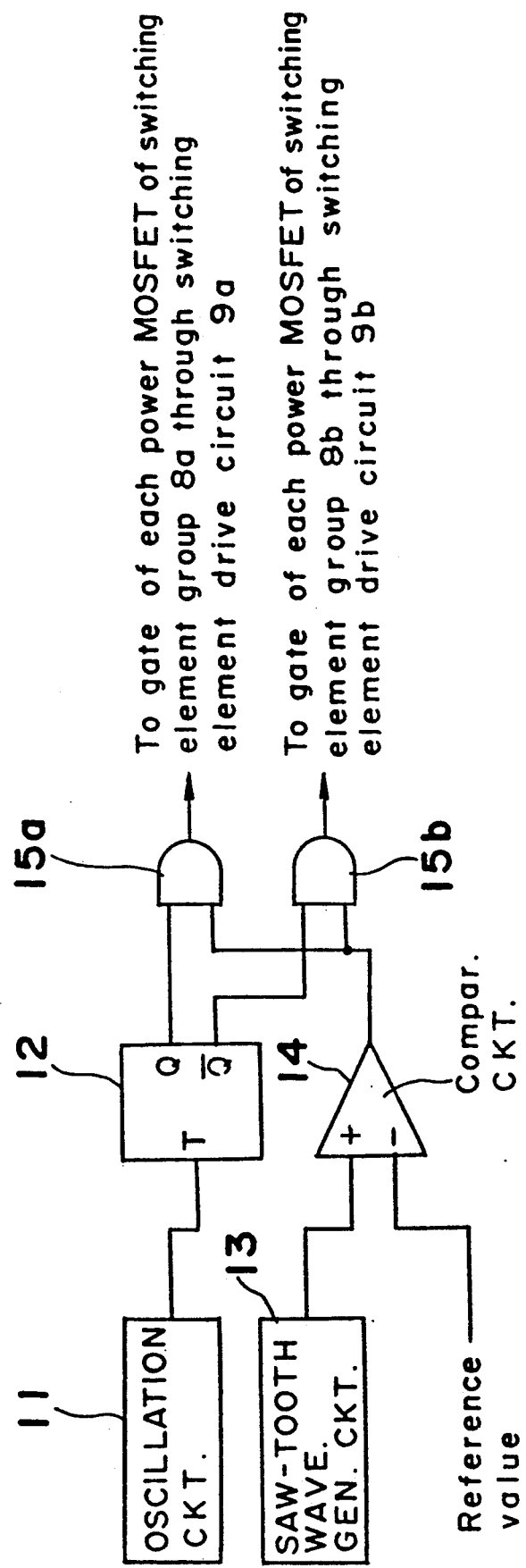
FIG. 2 is a block diagram for a control circuit employed in the driving circuit of FIG. 1.

Reference is also made to FIG. 2 showing a circuit diagram of the control circuit 10, in which an oscillation circuit 11 is connected to a toggle flip-flop 12 and coupled with a saw-tooth wave generating circuit 13. The toggle flip-flop 12 is connected to two AND gates 15a and 15b, while the saw-tooth wave generating circuit 13 is connected the two AND gates 15a and 15b through a comparison circuit 14. The toggle flip-flop 12 referred to above outputs two phase divided signals by using an output signal of the oscillation circuit 11 as a trigger, and the two phase divided signals are respectively inputted to the two AND gates 15a and 15b. Meanwhile, the oscillation output applied to the saw-tooth wave generating circuit 13 is inputted to the comparison circuit 14 after having been converted into the saw-tooth wave synchronized with the oscillation frequency of the oscillation circuit 11. Thus, in the a comparison circuit 14, comparison between the reference value for determining the output of the magnetron 5 (i.e. the threshold level for setting time to turn ON the power MOSFET) and the saw-tooth waveform is effected, and the output of the comparison circuit 14 is modulated so that the output becomes "high" during the period in which the voltage level of the saw-tooth wave is higher than the reference value so as to provide a predetermined ON time. The modulated signal is applied to the above AND gates 15a and 15b, and by obtaining an AND operation with respect to the signal divided into two phases at the toggle flip-flop 12, the switching element groups 8a and 8b, are alternately driven, while a period for simultaneously turning OFF the power MOSFETs of the two switching element groups is maintained.

The outputs of the above AND gates 15a and 15b are applied to the gates of the respective power MOSFETs included in the switching element groups 8a and 8b through the switching element drive circuits 9a and 9b. When the output of a the AND gate 15a is of "high" level, the power MOSFETs of the switching element group 8a are in the ON state, and when the output of the AND gate 15b is of a "high" level, the power MOSFETs of the switching element group 8b are turned ON.

Figure 3:
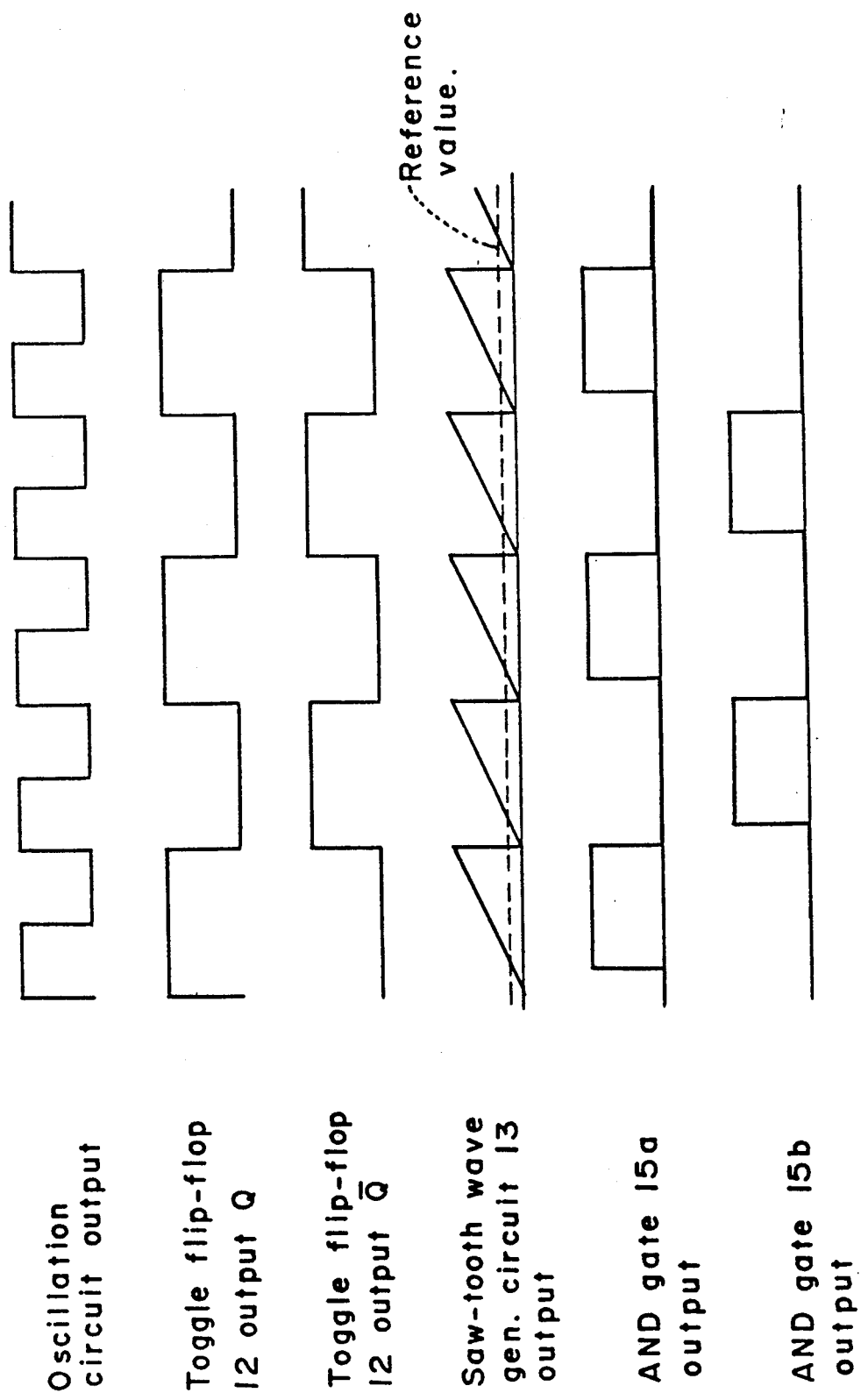
FIG. 3 is a waveform diagram showing the respective control signals for the control circuit of FIG. 2.

As shown in the representation function timings for the control circuit 10 in FIG. 3, since the outputs of the AND gates 15a and 15b alternately assume the high level, the power MOSFETs of the switching element groups 8a and 8b are also turned ON alternately. Here, for the outputs of the AND gates 15a and 15b, a reference value is set so that there exists a period where the outputs assume a "low" level simultaneously, i.e. a so-called dead time. It is to be noted that such a dead time is provided to prevent the two switching element groups 8a and 8b from simultaneously turning ON and causing a short-circuited state.

Subsequently, the operation of the embodiment as described so far will be explained.

When the power MOSFETs of the switching element group 8b are turned ON from the state where the switching element groups 8a and 8b are both turned OFF, current flows through a closed loop including the high voltage capacitor 7, the high voltage diode 6a, one end 3e of a secondary winding of the step-up transformer 3, and the other end 3d thereof in the secondary side circuit of the step-up transformer 3, with the voltage doubler capacitor 7 being charged. It should be noted here that the magnitude of the charging voltage for the voltage doubler capacitor 7 is determined by the initial voltage of said the voltage doubler capacitor 7 and the length of ON time for the power MOSFET of the switching element groups 8a and 8b.

When the power MOSFETs for the same switching element group 8b are then turned OFF, the electromagnetic energy stored in the step-up transformer 3 is regenerated to the power source 1, while being fed to the voltage doubler capacitor 7, and the functioning is shifted into a period where the power MOSFETs for the two switching element groups 8a and 8b are simultaneously turned OFF.

Subsequently, when the power MOSFET of the switching element groups 8a is turned ON, current flows through a closed loop including the high voltage diode 6b, the voltage doubler capacitor 7, one end 3d of the secondary winding for the step-up transformer 3, the other end 3e thereof, and the magnetron 5, with electric energy being fed to the magnetron 5. Here, it is to be noted that the power supplied to the magnetron 5 is determined by the voltage of the voltage doubler capacitor 7 and the length of ON time of the power MOSFETs for the switching element groups 8a and 8b. Meanwhile, when the power MOSFETs of the switching element group 8a are turned OFF, the electromagnetic energy stored in the step-up transformer 3 is regenerated to the power source 1 while being fed to the magnetron 5. The functioning as described so far is repeated for the magnetron 5 to continue oscillation of the high frequency power.

The voltage doubler capacitor 7 is charged by current waveform similar to the drain current waveform of the power MOSFET of the switching element group 8b for drawing an arc of oscillation set by the leakage inductance of the step-up transformer 3, the capacitance of the voltage doubler capacitor 7 and the circuit resistance (excluding the resistance of the magnetron 5). Meanwhile, electric energy is supplied to the magnetron 5 by the current waveform similar to the drain current waveform of the power MOSFETs for the switching element group 8a for drawing an arc of oscillation to be determined by the leakage inductance of the step-up transformer 3, the capacitance of the voltage doubler capacitor 7, and the circuit resistance (including the resistance of the magnetron 5).

Figure 4:
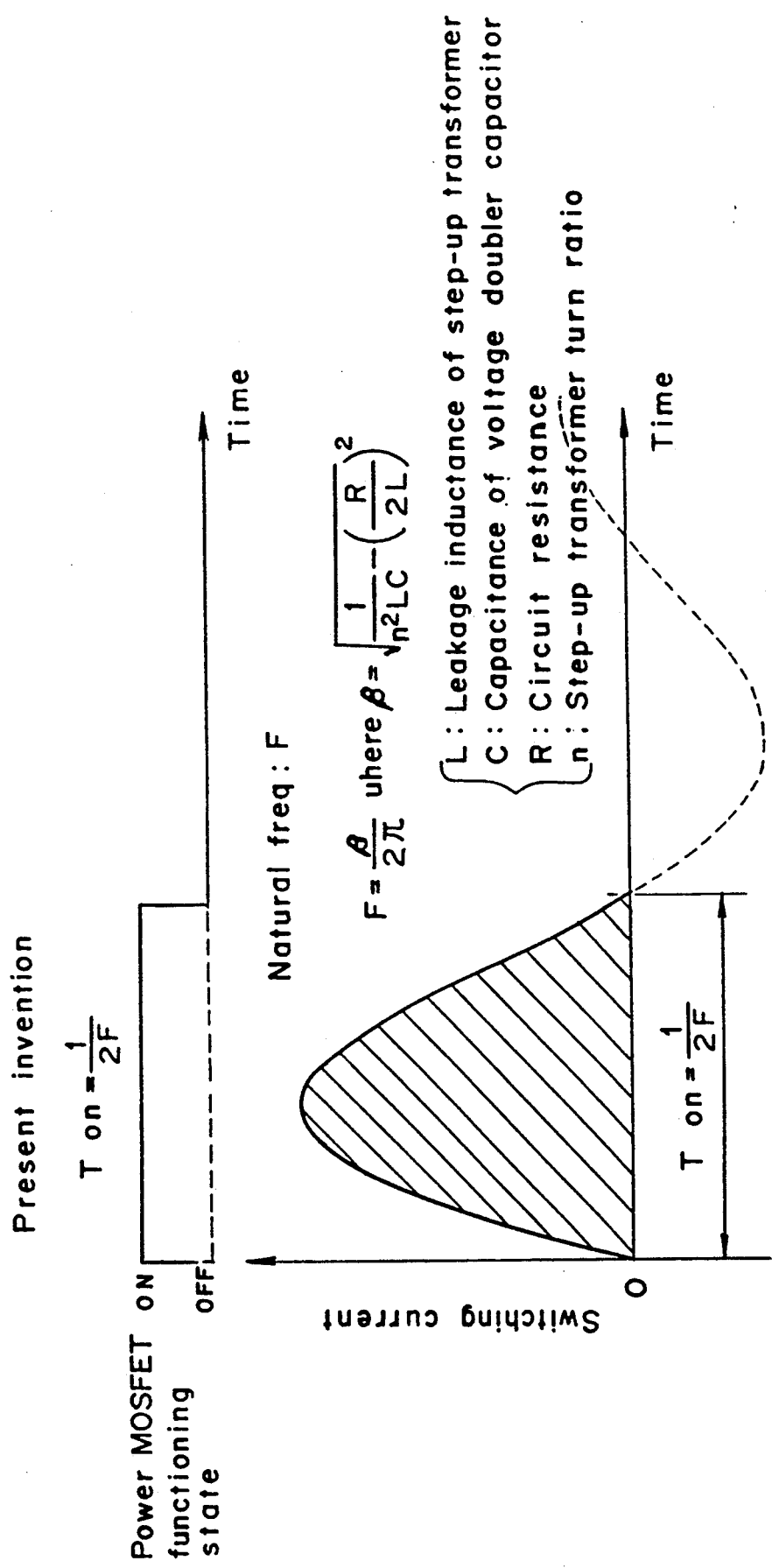
FIG. 4 is a diagram showing a switching current waveform of a power MOSFET (Metal Oxide Semiconductor Field Effect Transistor) employed in the arrangement of FIG. 1, FIGS. 5(a) and 5(b) are diagrams similar to FIG. 4, which particularly relate to comparative examples.

Referring further to FIG. 4 which shows the current waveform flowing through the power MOSFET in the present embodiment, the capability of increasing circuit output power will be explained in detail hereinbelow.

The current waveform referred to above oscillates at a natural frequency F set by the values of the leakage inductance of the step-up transformer 3, the capacitance of the voltage doubler capacitor 7, and the circuit resistance. When $\frac{1}{2}$ period of this waveform is subjected to oscillation so as to become equal to the ON time T on of the power MOSFET (T on = $1/(2F)$), the current during the ON period of the power MOSFET (i.e. the integral value during the ON period of the current waveform) may approximately be made a maximum, and consequently, the circuit output power can also be made generally maximum. In the relation T on < $1/(2F)$ or T on > $1/(2F)$, the current during the ON period becomes small as shown in FIGS. 5(a) and 5(b).

FIG. 6 is a graphical diagram for explaining the switching loss of the power MOSFETs according to the present embodiment (T on = $1/(2F)$). By referring to FIG. 6, the reduction of the switching loss will be explained, in which a dotted line represents the switching voltage waveform of the power MOSFETs, while a solid line shows the switching current waveform of the power MOSFETs. As shown in FIG. 6, since the drain current flowing through the power MOSFET at a rise time Tr during the transition from OFF to ON and at a falltime Tf during the transition from ON to OFF of the power MOSFET becomes almost zero, the generation of the transition loss may be suppressed as far as possible, with a simultaneous reduction of the switching loss. It is to be noted here that in general switching elements, the switching current at the rise time Tr and the fall time Tf tends to be large as shown in FIG. 7, and the transition loss is also increased.

The leakage inductance of the step-up transformer 3, the capacitance of the voltage doubler capacitor 7 and the circuit resistance may be specifically set as follows.

The natural frequency F of the current waveform for the power MOSFET is represented by the following equation.

$$F = \frac{\beta}{2\pi} \text{ where } \beta = \sqrt{\frac{1}{n^2 \cdot L \cdot C} - \left(\frac{R}{2L}\right)^2} \quad (1)$$

wherein
L: Leakage inductance of the step-up transformer
C: Capacitance of the voltage doubler capacitor
R: Circuit resistance
n: Winding ratio of the step-up transformer.

Accordingly, when the ON time of the power MOSFETs for the power switching element groups 8a and 8b are denoted by T on, the values for L,C and R are set to satisfy the relation represented by $$T \text{ on} = \frac{1}{2F} = \frac{\pi}{\sqrt{\frac{1}{n^2 \cdot L \cdot C} - \left(\frac{R}{2L}\right)^2}} \quad (2)$$

Connversely, the ON time T on of the power MOSFETs for the power switching element groups 8a and 8b may be set to ½ of the period of the natural frequency set by L,C and R. Moreover, in the above relation, although the value for L is described as the leakage inductance of the step-up transformer 3, a coil may be added to the circuit when adjustment of the inductance is to be effected.

Figure 8:
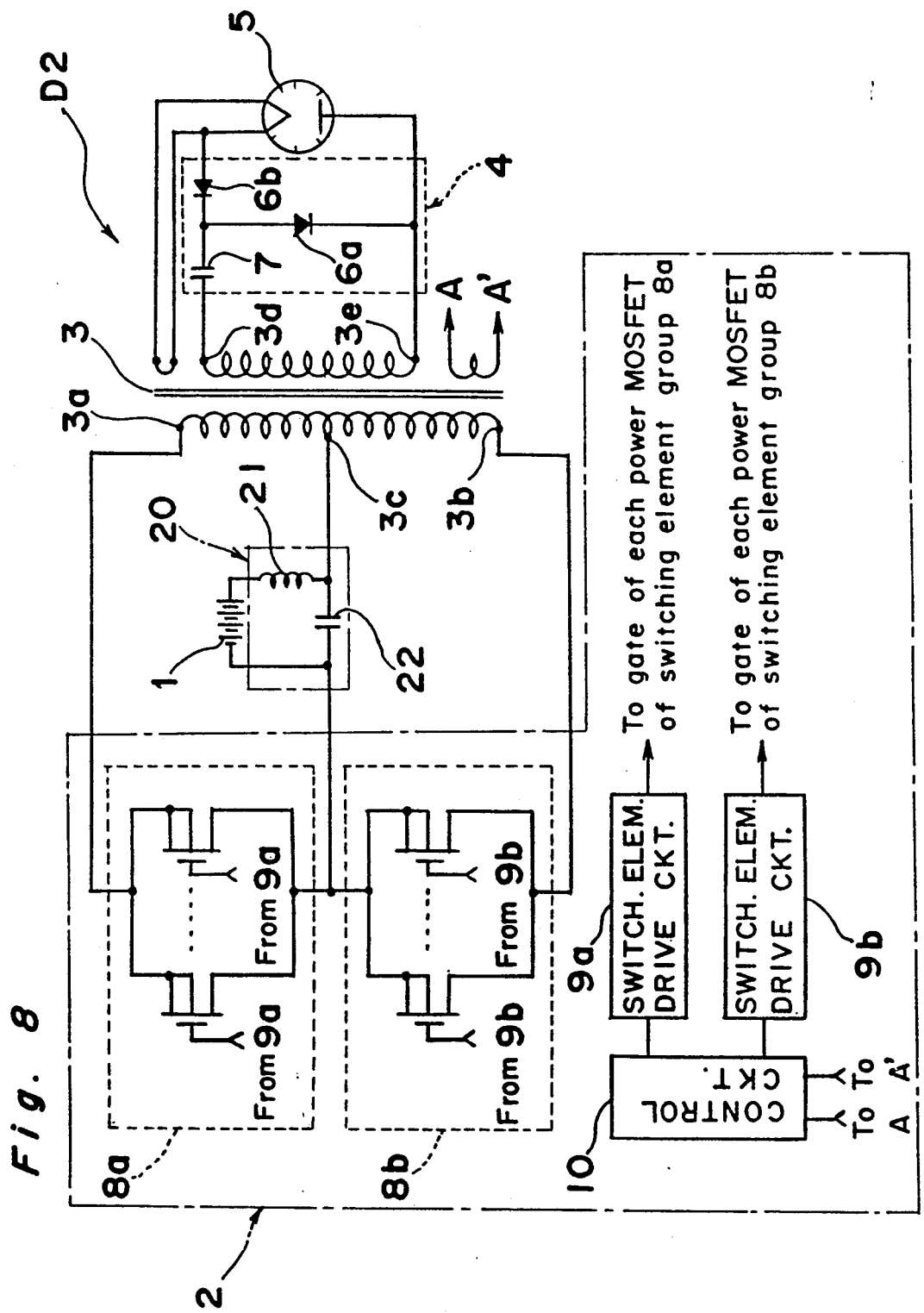
FIG. 8 is a view similar to FIG. 1, which particularly shows a modification thereof in which a filter circuit is further provided between the driving circuit and the D.C. power source in FIG. 1.

Referring further to FIG. 8, there is shown a modification of the driving circuit D1 for an inverter microwave oven described with reference to FIG. 1. The modified driving circuit D2 in FIG. 8 further includes a filter circuit 20 provided between the driving circuit and the D.C. power source 1 as shown. The filter circuit 20 includes a coil 21 inserted between the other end of the D.C. power source 1 and the center tap 3c of the primary winding of the step-up transformer 3, and a capacitor 22 inserted between the one end of the power source 1 and the other end of the coil 21 connected to the center tap. Other constructions and connections of the driving circuit D2 are generally similar to those for the driving circuit D1 in FIG. 1, with like parts being designated by like reference numerals for brevity of explanation.

In the modified driving circuit D2 of FIG. 8, when the electromagnetic energy is regenerated to the D.C. power source 1 during the respective rest periods as referred to above, the A.C. component of the electromagnetic energy can be eliminated to a certain extent. As a result, the D.C. power source may be protected thereby.

In the operation, the driving circuit D2 in FIG. 8 provided with the filter circuit 20 is different from the driving circuit D1 of FIG. 1 without any filter circuit in the following points.

In the first place, when the respective power MOSFETs of the switching element group 8b are turned ON from the state where the respective power MOSFETs of the two switching element groups 8a and 8b are simultaneously turned OFF (i.e. the rest period), the voltage doubler capacitor 7 is charged by the current drawing the arc of oscillation set by the leakage inductance of the step-up transformer 3, the combined capacitance of the capacitor 7 of the voltage doubler rectifier circuit 4 and the capacitor 22 of the filter circuit 20 and the circuit resistance (excluding the resistance of the magnetron).

Subsequently, after the rest period, when the respective power MOSFETs of the switching element group 8a are turned ON, electric energy is supplied to the magnetron 5 by the current drawing an arc of oscillation to be determined by the leakage inductance of the step-up transformer 3, the combined capacitance of the capacitors 7 and 22 of the rectifier circuit 4 and the filter circuit 20, and the circuit resistance (including the resistance of the magnetron 5).

Following the above function, the current waveform of the respective power MOSFET is subjected to oscillation by a natural frequency determined by the circuit constant, i.e. the leakage inductance of the step-up transformer 3, the combined capacitance of the capacitors 7 and 22, and the circuit resistance. In other words, the value C in the equations (1) and (2) already referred to becomes the combined capacitance value of the voltage doubler capacitor 7 and the capacitor 22. Accordingly, by adjusting the value of the above circuit constant containing this combined capacitance or by setting ½ period of the natural frequency equal to the ON time T on of the power MOSFET through adjustment of the ON time T on of the power MOSFET, the circuit output power to be produced may be made maximum in the similar manner as in the driving circuit without the filter described earlier, for reduction of the switching loss.

Figure 9:
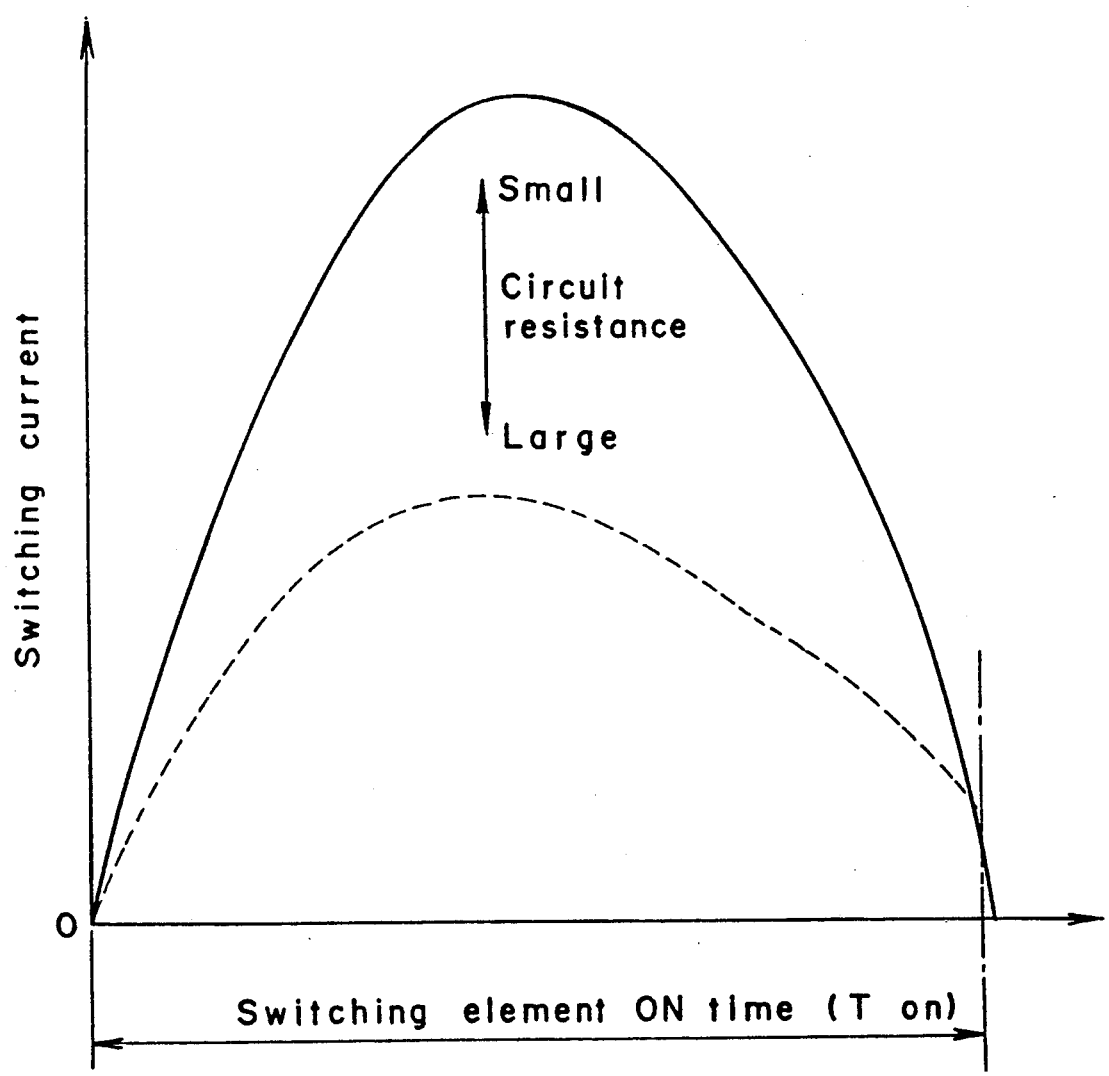
FIG. 9 is a graphical diagram showing the relation between the circuit resistance and the switching current.
Figure 10A:
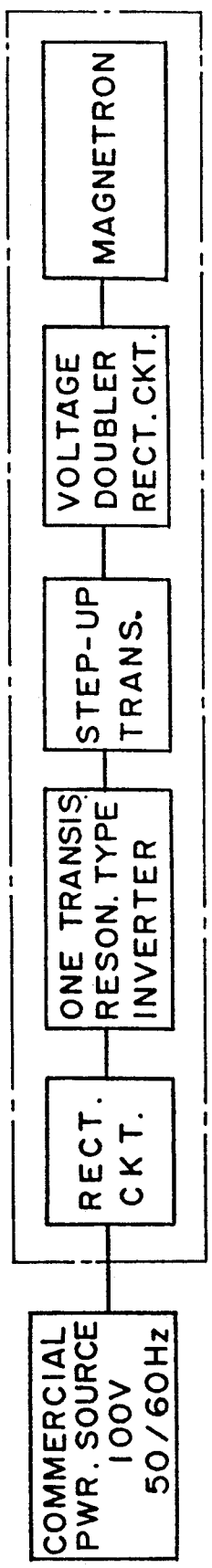
FIG. 10(a) is a block diagram showing the general construction of a conventional inverter microwave oven (already referred to)
Figure 10B:
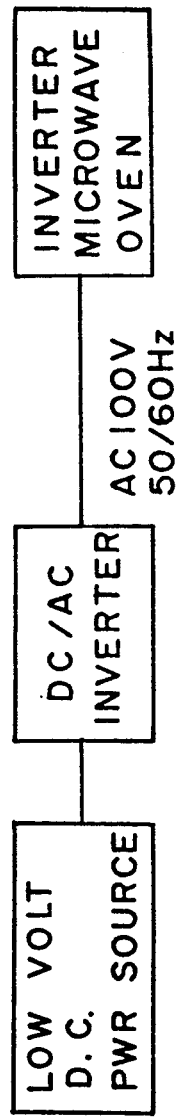
FIG. 10(b) is also a block diagram for explaining a method of driving the conventional inverter microwave oven by employing of a low voltage D.C. power source (already referred to).

Moreover, the parallel connection of the power MOSFETs according to the above embodiment serves to reduce the circuit resistance through the ON resistance reduction of the switching element groups. Accordingly, as shown in FIG. 9, the switching current is increased by the amount of reduction of the circuit resistance, and thus, the output can be increased to that extent. Furthermore, another advantage of connecting the switching elements in the parallel relation, is a reduction of the conduction loss by the reduction of the circuit resistance per one transistor, while such reduction of the conduction loss is also available as the switching element groups on the whole.

As described earlier, the circuit resistance during the period from turning ON the power MOSFETs of the switching element group 8b to charging the voltage doubler capacitor 7 does not include the resistance component of the magnetron 5, whereas the circuit resistance during the period from turning ON the power MOSFETs of the switching element group 8a to supply electric energy to the magnetron 5, includes the resistance component of the magnetron 5. In this case, as the resistance component of the magnetron 5, a value obtained by converting an equivalent resistance of the magnetron 5 into the primary side (i.e. a value divided by a square of the winding ratio of the step-up transformer 3) is added to the circuit resistance. However, in the circuit of the present embodiment having the low voltage D.C. power supply as the power source, the resistance component of the magnetron 5 is very small due to a high winding ratio n of the step-up transformer, as compared with the case where the commercial power supply is directly rectified. Accordingly, similar switching current waveforms may be obtained both during the ON period of the power MOSFETs of the switching element group 8a and during the ON period of the power MOSFETs of the switching element group 8b, with almost a maximum output being available in either of the cases. Additionally, the transition loss during the OFF period of the power MOSFETs may be suppressed.

It is to be noted here that in any of the above cases, it is necessary to control the ON time periods of the power MOSFETs of the two switching element groups 8a and 8b to be equal for prevention of the deviated magnetization of the step-up transformer 3.

As is clear from the foregoing description, according to the present embodiment, in contrast to the conventional arrangements, the DC/AC inverter is not employed, while the ½ period of the natural frequency of the current waveform for the switching element group is set to be equal to the ON time of the switching elements. Therefore, the driving circuit for the inverter microwave oven with a low voltage input of a small switching loss and having a large output through a high power utilizing rate may be provided at a low cost. Moreover, since the switching element group has the switching elements connected in the parallel relation, the ON resistance of the switching element group and consequently, the resistance of the driving circuit, may be advantageously reduced. Furthermore, because the low voltage D.C. power supply is directly converted into the high frequency current, the step-up transformer, which is the most bulky and heaviest component in the driving circuit, can be reduced both in size and weight for providing a compact size of the driving circuit on the whole. Additionally, in the case where the filter circuit including the coil and capacitor is provided between the main driving circuit and the D.C. power source, the A.C. component of the electromagnetic energy can be removed to a certain extent when the electromagnetic energy is regenerated to the D.C. power source during the rest period of the switching elements, and thus, it becomes possible to protect the D.C. power source.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A driving circuit for an inverter microwave oven comprising:
    a push-pull voltage type inverter circuit including,
        two sets of switching element groups each having at least two switching elements connected in parallel to each other for switching D.C. current supplied from a D.C. power source, and
        control means arranged to set a period for simultaneously turning off said two sets of switching element groups and to alternately turn on said switching element groups by the same duty cycle;
    a set-up transformer supplied, at its primary winding having a center tap, with A.C. current from said push-pull voltage type inverter circuit; and
    a voltage doubler rectifier circuit connected to a secondary winding of said set-up transformer for supplying electric power to a magnetron through a first capacitor;
    the driving circuit being set so that one half period of a waveform of current flowing through said switching elements becomes equal to said duty cycle by adjusting a leakage inductance of said step-up transformer, a capacitance value of said first capacitor and a circuit resistance of said voltage doubler rectifier circuit or by adjusting said duty cycle of for alternately turning on said switching element groups.

2. A driving circuit as claimed in claim 1, further comprising a filter circuit including a coil and a second capacitor provided between said push-pull voltage type inverter circuit and said D.C. power source,
    the driving circuit being set so that one half period of a waveform of current flowing through said switching elements becomes equal to said duty cycle by adjusting the leakage inductance of said step-up transformer, a composite capacitance value of said first and second capacitors and the circuit resistance of said voltage doubler rectifier circuit and said filter circuit or by adjusting said duty cycle for alternately turning on said switching element groups.

3. A method for driving an inverter microwave oven, comprising the steps of:
    switching D.C. current supplied from a D.C. power source by a push-pull voltage type inverter circuit including two sets of switching element groups each having at least two switching elements connected in parallel to each other;
    setting a period for alternately turning on said switching element groups by the same duty cycle;
    setting a period for simultaneously turning off said switching element group;
    supplying a step-up transformer with A.C. current from said push-pull voltage type inverter circuit at its primary winding having a center tap;
    supplying electric power to a magnetron through a first capacitor by a voltage doubler rectifier circuit connected to a secondary winding of said step-up transformer; and
    adjusting a leakage inductance of said step-up transformer, a capacitance value of said first capacitor and a circuit resistance of said voltage doubler rectifier circuit or said duty cycle for alternately turning on said switching element groups so that one half period of a waveform of current flowing through said switching elements becomes equal to said duty cycle.

4. A method as claimed in claim 3, further comprising the step of adjusting the leakage inductance of said step-up transformer, a composite capacitance value of said first capacitor and a second capacitor of a filter circuit including a coil and said second capacitor provided between said push-pull voltage type inverter circuit and said D.C. power source and the circuit resistance of said voltage doubler rectifier circuit and said filter circuit or said duty cycle for alternately turning on said switching element groups so that one half period of a waveform of current flowing through said switching elements becomes equal to said duty cycle.

* * * * *